United States Patent
Kwatra et al.

(10) Patent No.: US 11,503,526 B2
(45) Date of Patent: Nov. 15, 2022

(54) PREDICTIVE COMMUNICATION COMPENSATION

(71) Applicant: INTERNATIONAL BUSINESS MACHINES CORPORATION, Armonk, NY (US)

(72) Inventors: Shikhar Kwatra, San Jose, CA (US); Ashraf Mahmoud Mohamed Ahmed Awwad, Mississauga (CA); Adam Lee Griffin, Dubuque, IA (US); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 17/021,183

(22) Filed: Sep. 15, 2020

(65) Prior Publication Data

US 2022/0086724 A1 Mar. 17, 2022

(51) Int. Cl.
*H04W 36/18* (2009.01)
*H04W 36/14* (2009.01)
(Continued)

(52) U.S. Cl.
CPC ............ *H04W 36/18* (2013.01); *G10L 15/20* (2013.01); *G10L 15/22* (2013.01); *G10L 15/26* (2013.01);
(Continued)

(58) Field of Classification Search
CPC ..... H04W 36/18; H04W 36/14; H04W 36/30; H04W 84/042; H04W 84/12; G10L 15/20;
(Continued)

(56) References Cited

U.S. PATENT DOCUMENTS

| 7,099,309 | B2 | 8/2006 | Davidson |
| 7,546,125 | B2 | 6/2009 | Sharma |

(Continued)

FOREIGN PATENT DOCUMENTS

| CN | 101427599 A | 5/2009 |
| CN | 110300443 A | 10/2019 |

(Continued)

OTHER PUBLICATIONS

International Searching Authority, Notification of Transmittal of The International Search Report and The Written Opinion of the International Searching Authority, or the Declaration, dated Nov. 25, 2021, File Reference EIE210617PCT, International Application No. PCT/CN2021/115797, pp. 1-9.

(Continued)

*Primary Examiner* — Marisol Figueroa
(74) *Attorney, Agent, or Firm* — Daniel J. Hakimi

(57) ABSTRACT

A method, a computer program product, and a computer system predictively compensate for expected audio communication issues. The method includes determining conditions of a first device associated with a user. The method includes determining, based on the conditions, a first signal strength to a first network that the first device is currently connected in which to perform a communication and a second signal strength to a second network that the first device is configured to utilize in performing the communication. As a result of each of the first signal strength and the second signal strength not satisfying a minimum threshold individually, the method includes generating an overall signal having an overall signal strength by layering the first network over the second network. The overall signal strength has a comparatively greater signal strength than the first signal strength and the second signal strength. The method includes performing the communication using the overall signal.

14 Claims, 5 Drawing Sheets

(51) Int. Cl.
  H04B 17/318    (2015.01)
  H04W 36/30     (2009.01)
  G10L 25/51     (2013.01)
  G10L 15/20     (2006.01)
  G10L 15/22     (2006.01)
  G10L 15/26     (2006.01)
  H04W 84/12     (2009.01)
  H04W 84/04     (2009.01)

(52) U.S. Cl.
  CPC ............ *G10L 25/51* (2013.01); *H04B 17/318* (2015.01); *H04W 36/14* (2013.01); *H04W 36/30* (2013.01); *H04W 84/042* (2013.01); *H04W 84/12* (2013.01)

(58) Field of Classification Search
  CPC ......... G10L 15/22; G10L 15/26; G10L 25/51; H04B 17/318
  See application file for complete search history.

(56) References Cited

U.S. PATENT DOCUMENTS

| | | | |
|---|---|---|---|
| 8,078,164 B2 | 12/2011 | Ganesan | |
| 8,228,861 B1 | 7/2012 | Nix | |
| 9,179,387 B2 | 11/2015 | Hedqvist | |
| 9,661,515 B2 | 5/2017 | Lord | |
| 10,159,022 B2 | 12/2018 | Senarath | |
| 10,419,996 B2 | 9/2019 | Ganesan | |
| 2005/0147049 A1 | 7/2005 | Ganesan | |
| 2006/0073786 A1 | 4/2006 | Sarkar | |
| 2007/0140471 A1* | 6/2007 | Gutta | H04M 19/044 379/392.01 |
| 2007/0167167 A1 | 7/2007 | Jiang | |
| 2017/0230871 A1 | 8/2017 | Rangaswamy | |
| 2020/0358508 A1* | 11/2020 | Li | H04B 7/0626 |
| 2021/0227389 A1* | 7/2021 | Baldwin | H04M 3/46 |

FOREIGN PATENT DOCUMENTS

| | | | |
|---|---|---|---|
| CN | 111050346 A | 4/2020 | |
| WO | WO-2015048439 A1 * | 4/2015 | ......... H04L 65/1069 |
| WO | 2018108701 A1 | 6/2018 | |
| WO | 20181087011 W | 6/2018 | |
| WO | 2019148314 A1 | 8/2019 | |
| WO | 20191483141 W | 8/2019 | |
| WO | 2019179305 A1 | 9/2019 | |
| WO | 2022057619 A1 | 3/2022 | |

OTHER PUBLICATIONS

Bui et al., "A Survey of Anticipatory Mobile Networking: Context-Based Classification, Prediction Methodologies, and Optimization Techniques". arXiv:1606.00191v3, [cs.NI], Apr. 11, 2017, pp. 1-31.
Mell et al., "The NIST Definition of Cloud Computing", National Institute of Standards and Technology, Special Publication 800-145, Sep. 2011, pp. 1-7.
Prasad et al., "Movement Prediction in Wireless Networks Using Mobility Traces", In 2010 7th IEEE Consumer Communications and Networking Conference (Jan. 2010), IEEE, (pp. 1-5).
Rebecchi et al., "Data Offloading Techniques in Cellular Networks: A Survey". Communications Surveys and Tutorials, IEEE Communications Society, Institute of Electrical and Electronics Engineers, 2015,17(2), 2014, pp. 1-26.
Zhang et al., "Mobility Prediction: A Survey on State-Of-The-Art Schemes and Future Applications", Digital Object dentifier 10.1109/ACCESS.2018.2885821, Dec. 10, 2018, IEEE Access, pp. 802-822.

* cited by examiner

PREDICTIVE COMMUNICATION COMPENSATION

BACKGROUND

The exemplary embodiments relate generally to communications, and more particularly to predicting when an audio communication experiences an issue and determining a manner to compensate for the issue.

A user may utilize one or more portable devices to perform a voice communication with another user. Depending on a variety of factors, a plurality of different types of issues may arise when a current communication link for the voice communication is in progress. The issues may be related to an availability of network signals from different networks, a location being particularly crowded or noisy, a contextual situation of the surrounding, etc. For example, if the user is traveling and having a telephonic conversation, the user may not be able to listen to the spoken content being received due to external noise, the user's current device is not receiving proper signal strength, etc. Under conventional approaches, the user may be required to simply conclude the communication and try again at a later time when the issues have resolved naturally or the user may continue the communication while straining to continue the conversation.

SUMMARY

The exemplary embodiments disclose a method, a computer program product, and a computer system for predictively compensating for expected audio communication issues. The method comprises determining conditions of a first device associated with a user. The method comprises determining, based on the conditions, a first signal strength to a first network that the first device is currently connected in which to perform a communication and a second signal strength to a second network that the first device is configured to utilize in performing the communication. As a result of each of the first signal strength and the second signal strength not satisfying a minimum threshold individually, the method comprises generating an overall signal having an overall signal strength by layering the first network over the second network. The overall signal strength has a comparatively greater signal strength than the first signal strength and the second signal strength. The method comprises performing the communication using the overall signal.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
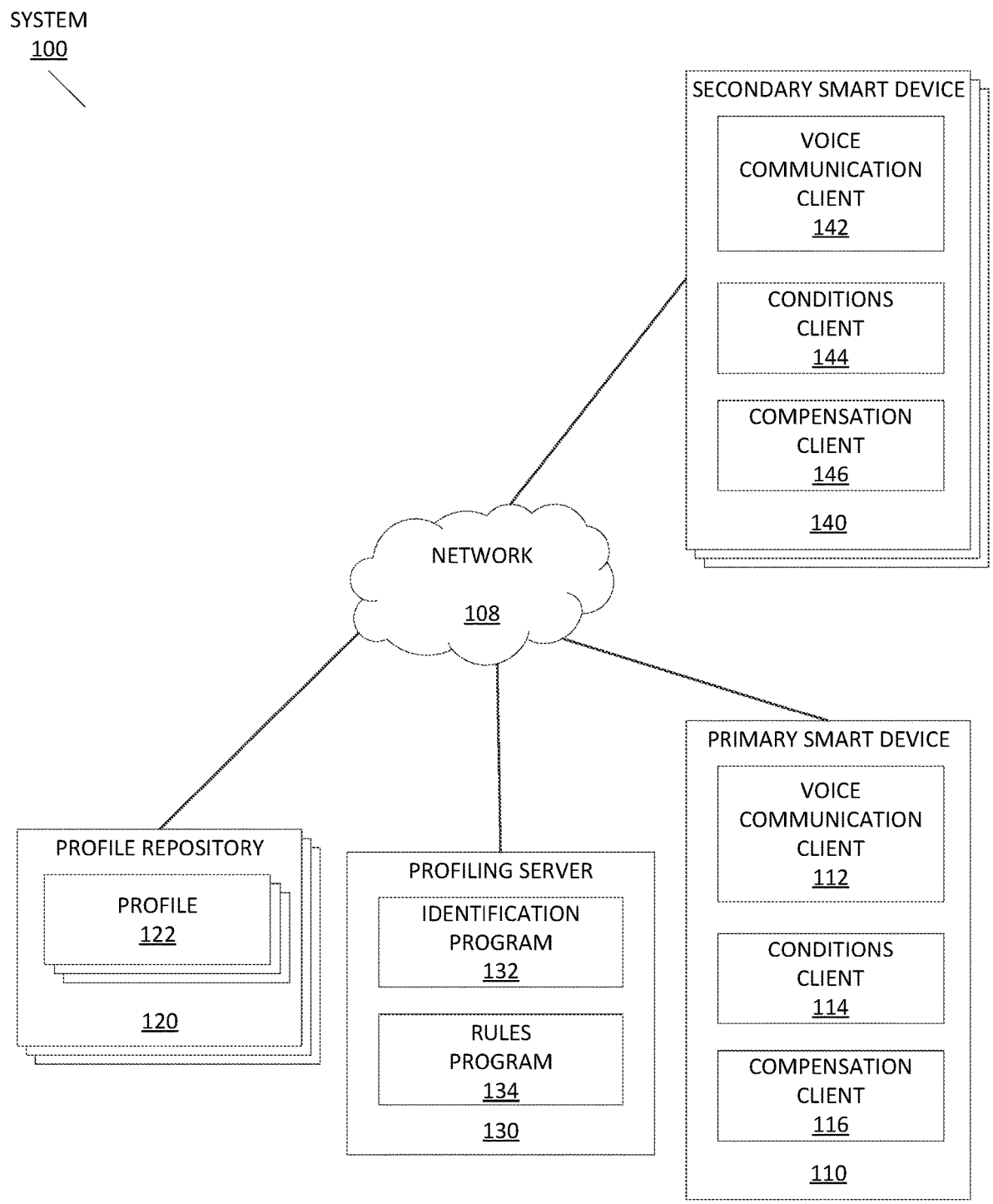
FIG. 1 depicts an exemplary schematic diagram of a voice compensation system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for predictively compensating for expected audio communication issues through a set of rules that define a compensation measure based on conditions that are expected or are present. The exemplary embodiments may provide an intelligent mechanism by which seamless communication may be accomplished through a dynamic mode change, layering of available mechanisms, etc. to improve a communication link and prevent an interruption in the communication in a seamless manner. With the wide variety of reasons that a communication may lack a seamless quality that users may expect, the exemplary embodiments may utilize a dynamic and modular layering of input methods for a communication to proceed. Key benefits of the exemplary embodiments may include providing a seamless mechanism for a user to perform a voice communication to receive incoming voice messages in a predictive manner to minimize actions required from the user. Detailed implementation of the exemplary embodiments follows.

Conventional approaches have provided many different solutions so that a communication may be performed and to compensate for issues that may arise during the communication. For example, a conventional approach manages heterogeneous wireless devices in three or more different types of networks. In another example, a conventional approach automatically switches a communication that is already in progress using a wireless cellular network to a wireless Voice over IP (VoIP) network or vice versa. In a further example, a conventional approach predicts mobile device migration between geographical locations of a wireless network using a migration probability database. In yet another example, a conventional approach offloads data from a first cellular wireless communication interface to a second wireless communication interface, without impacting cellular wireless protocols of a cellular wireless communication network. In an additional example, a conventional approach performs a vertical handover of a wireless voice connection. However, these conventional approaches do not dynamically layer VoIP and cellular to make a communication stronger to enjoy a seamless communication based on implicit and explicit feedback along with context attribute nor do these conventional approaches describe real time conversation of speech to text based on a signal strength and ambient conditions.

As those skilled in the art will appreciate, network availability may be spotty, or there may be excessive crowds and poor bandwidth through a momentary overload of signals to switch. Furthermore, lousy weather and even a software glitch may exist which result in dropped calls leading to a poor user experience. In light of these issues and the shortcomings of conventional approaches, the exemplary embodiments provide a mechanism for dynamically projecting and/or predicting patterns of movement for a user and/or groups of people. Using data derived and based on static and/or dynamic user clustering and densities from location determining methods, the exemplary embodiments may compile statistic and machine learning inputs that are used to compensate for issues that exist or are predicted. Based on pattern analysis and other available analysis approaches, the exemplary embodiments may proactively determine when a compensation measure is to be affected (e.g., between cellular and VoIP communication systems) and provide forecasting inputs for pre-demand bandwidth expansion to enable providers insight into infrastructure needs and planned purchasing power, thereby reducing cost for vendor service providers and a high level of call quality for users. Furthermore, the exemplary embodiments may utilize a compensation measure involving a layering of both cellular and VoIP if both signal qualities are relatively weak on its own while reserving an option to utilize a compensation measure based on user preferences across multiple devices associated with the user. Still further, the exemplary embodiments may provide a compensation measure involving voice transcription that transcribes voice to text in real time, particularly due to surrounding conditions that do not permit the user from properly deciphering incoming voice communications.

The exemplary embodiments are described with particular reference to a voice communication and compensating for issues that may arise during the voice communication. However, the exemplary embodiments may be utilized and/or modified for use with any type of communication and more generally to data exchange. Accordingly, the mechanisms provided by the exemplary embodiments may be utilized and/or modified for use in proactively compensating for issues arising or predicted to arise during a communication or data exchange.

FIG. 1 depicts a voice compensation system 100, in accordance with the exemplary embodiments. According to the exemplary embodiments, the voice compensation system 100 may include a primary smart device 110, one or more profile repositories 120, a profiling server 130, and one or more secondary smart devices 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

The exemplary embodiments are described with regard to a user who may have a plurality of smart devices that may be associated with the user (e.g., may be accessible and usable by the user). The plurality of smart devices may include the primary smart device 110 and the one or more secondary smart devices 140. The primary and secondary designation is representative of a perspective for which the exemplary embodiments may be implemented and does not define a priority. For example, the primary smart device 110 may be a device that is currently in use while the secondary smart devices 140 may be devices that are currently available for use by the user (e.g., within a usable proximity to the user). Thus, the "primary" designation may refer to a device in use and the "secondary" designation may refer to a device available for use but not currently in use.

In the exemplary embodiments, the network 108 may be a communication channel capable of transferring data between connected devices. Accordingly, the components of the voice compensation system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the voice compensation system 100 that do not utilize the network 108. As will be described in detail below, a connection may be established between the primary smart device 110 and one of the secondary smart devices 140 that may or may not utilize the network 108 in exchanging information that may be used to determine a compensation measure. A further connection may be established between the primary smart device 110 and a further smart device (not shown) of a further user to perform a voice communication via the network 108.

In the exemplary embodiments, the primary smart device 110 may include a voice communication client 112, a conditions client 114, and a compensation client 116, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the primary smart device 110 is shown as a single device, in other embodiments, the primary smart device 110 may be comprised of a cluster or plurality of computing devices, in a modular manner, etc., working together or working independently. The primary smart device 110 is described in greater detail as a hardware implementation with reference to FIG. 3, as part of a cloud implementation with reference to FIG. 4, and/or as utilizing functional abstraction layers for processing with reference to FIG. 5.

The one or more secondary smart devices 140 may be substantially similar to the primary smart device 110. Accordingly, the one or more secondary smart devices 140 may include a voice communication client 142, a conditions client 144, and a compensation client 146 that are substantially similar to the corresponding client of the primary smart device 110. For efficiency, the description of the primary smart device 110 and its components may be applicable to the one or more secondary smart devices 140 and its components. Thus, the description below for the voice communication client 112 may apply to the voice communication client 142 and so forth. As noted above, the primary smart device 110 may provide a perspective with regard to a currently used device by the user while the one or more secondary smart devices 140 may be available devices that are accessible to the user. However, it is noted that the inclusion of the one or more secondary smart devices 140 is only exemplary and the voice compensation system 100 may only include the primary smart device 110 without any of the one or more secondary smart devices 140.

In the exemplary embodiments, the voice communication client 112 may act as a client in a client-server relationship and may be a software, hardware, and/or firmware based application capable of allowing the user of the primary smart device 110 to perform a communication with a further user via a further device via the network 108. In embodiments, the conditions client 114 may receive an input for a selected further user and perform subsequent operations to establish a communication link (e.g., as a result of the further user accepting the communication request), exchange voice communications between the user and the further user, and break down the communication link when the communication has concluded, and utilize various wired and/or wireless connection protocols for data transmission and exchange associated with data used for performing a communication, including Bluetooth, 2.4 gHz and 5 gHz internet, near-field communication, Z-Wave, Zigbee, etc.

The voice communication client 112 may be configured to provide a user interface in which to perform a communication. For example, the user interface may store an address book or provide an input feature to select one or more further users in establishing the communication. In another example, the user interface may provide options in which the user may select parameters (e.g., volume control) to perform the communication. The voice communication client 112 may perform a variety of different types of communications in which voice communications are involved. For example, the voice communication client 112 may perform a telephonic communication utilizing audio features. In another example, the voice communication client 112 may perform a video communication utilizing video and audio features.

The voice communication client 112 may also be configured to incorporate features of the exemplary embodiments. In an exemplary implementation, the voice communication client 112 may be configured to receive inputs from a further client or program to present options or alerts for compensation measures that may be utilized or applied. According to this exemplary implementation, the voice communication client 112 may present the features to the user via the user interface (e.g., an overlay). In another exemplary implementation, the voice communication client 112 may be configured to be pre-programmed with the features of the exemplary embodiments. Thus, upon receiving instructions from a further client or program, the voice communication client 112 may present the options or alerts via the user interface of the voice communication client 112.

In the exemplary embodiments, the conditions client 114 may act as a client in a client-server relationship and may be a software, hardware, and/or firmware based application capable of determining conditions being experienced by the primary smart device 110 including signal strength, available signals, ambient noise, voice input interpretation, etc., and utilize various wired and/or wireless connection protocols for data transmission and exchange associated with data used for compensating for arising or predicted to arise during a communication, including Bluetooth, 2.4 gHz and 5 gHz internet, near-field communication, Z-Wave, Zigbee, etc.

The conditions client 114 may utilize a plurality of sensors and/or receive data from available components that have determined information related to the conditions being experienced by the primary smart device 110. For example, the primary smart device 110 may include a network card or chip along with an antenna that is configured to transmit and/or receive signals. The primary smart device 110 may also include functionality related to measuring signal strength of available signals. The conditions client 114 may receive the information related to signal strength that may be interpreted to determine a relative quality in using a corresponding signal. In another example, the primary smart device 110 may include a microphone or other audio input device configured to receive audio and convert the audio into corresponding audio data. The conditions client 114 may receive the audio data and interpret ambient noise conditions (e.g., background noise), a user experience (e.g., interpretation of utterances from the user), etc. In a further example, the conditions client 114 may utilize the network card or chip to determine the secondary smart devices 140 that are usable by the user (e.g., within a proximity to the user). The conditions client 114 may request information from the secondary smart devices 140 to determine conditions being experienced by the secondary smart devices 140 (e.g., substantially similar condition information as determined for the primary smart device 110). In yet another example, the conditions client 114 may receive information indicative of probable conditions that are predicted to be experienced by the user at a corresponding time. As will be described in further detail below, the conditions client 114 may have access to various types of information (e.g., a calendar program, the profiling server 130, etc.) that may indicate direct and/or indirect information that may be used in inferring likely conditions (e.g., user is scheduled to attend a concert on a particular day for a given time period which is indicative of a condition that the user will likely experience high ambient noise).

In the exemplary embodiments, the compensation client 116 may act as a client in a client-server relationship and may be a software, hardware, and/or firmware based application capable of determining a compensation measure to utilize under a given set of conditions that are currently being experienced and/or predicted to occur via the network 108. In embodiments, the compensation client 116 may utilize a set of rules as determined by the profiling server 130 to define when and how to utilize a compensation measure, and utilize various wired and/or wireless connection protocols for data transmission and exchange associated with data used for compensating issues arising or predicted to arise during a communication, including Bluetooth, 2.4 gHz and 5 gHz internet, near-field communication, Z-Wave, Zigbee, etc.

The compensation client 116 may be configured to apply a compensation measure based on the conditions being or predicted to be experienced by the primary smart device 110 and/or the user utilizing the primary smart device 110. As will be described in further detail below, the compensation client 116 may determine a course of action based on rules that are set out for the user in using the primary smart device 110 and the secondary smart devices 140. The compensation client 116 may utilize a variety of different compensation measures that include at least one of determining between the primary smart device 110 and the secondary smart devices 140, utilizing a voice to text conversion feature, switching from a first network to a second, available network, layering multiple networks for improved signal strength, etc.

As described above, the voice compensation system 100 may include the primary smart device 110 and one or more secondary smart devices 140 that are associated with a user where the primary smart device 110 is currently in use by the user. As will be described below, the exemplary embodiments may utilize a compensation measure where one of the secondary smart devices 140 are to instead be used. When the user instead utilizes one of the secondary smart devices 140, whichever device in use may be designated the primary smart device 110. Accordingly, a secondary smart device 140 that is being used may be designated as the primary smart device 110 and the primary smart device 110 that is no longer in use may be designated as the secondary smart device 140.

In the exemplary embodiments, the profile repository 120 may include one or more profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 120 is shown as a single device, in other embodiments, the profile repository 120 may be comprised of a cluster or plurality of electronic devices, in a modular manner, etc., working together or working independently. While the profile repository 120 is also shown as a separate component, in other embodiments, the profile repository 120 may be incorporated with one or more of the other components of the voice compensation system 100. For example, the profile repository 120 may be incorporated in the profiling server 130. Thus, access to the profile repository 120 by the profiling server 130 may be performed locally. In another example, the profiles 122 represented in the profile repository 120 may be incorporated in the primary smart device 110 and/or the secondary smart devices 140 (e.g., each of the primary smart device 110 and the secondary smart devices 140 have a profile repository 120 including the profile 122 of the user who is associated with these devices). Thus, access to the profile repository 120 and to the profile 122 associated with the user may be performed through a transmission from the primary smart device 110 and/or the secondary smart device 140. The profile repository 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the profiles 122 may each be associated with a user associated with the primary smart device 110 and the secondary smart devices 140. The profiles 122 may be populated with various types of information that may be used for subsequent operations used in compensating for issues that arise or may arise during a communication. For example, the profiles 122 may include technical information of the primary smart device 110 and the secondary smart devices 140. The technical information may include information related to components (e.g., microphone) and settings associated with the components (e.g., sensitivity to receive audio inputs). In another example, the profiles 122 may be populated with location information that indicates where a user may be located at a given time. The location information may be based on direct inputs such as a calendar application and/or based on inferred information from historical data or expectation criteria.

In the exemplary embodiments, the profiling server 130 may include an identification program 132 and a rules program 134, and act as a server in a client-server relationship with the clients 112, 114, 116, 142, 144, 146 as well as be in a communicative relationship with the profile repository 120. The profiling server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the profiling server 130 is shown as a single device, in other embodiments, the profiling server 130 may be comprised of a cluster or plurality of computing devices, working together or working independently. While the profiling server 130 is also shown as a separate component, in other embodiments, the operations and features of the profiling server 130 may be incorporated with one or more of the other components of the voice compensation system 100. For example, the operations and features of the profiling server 130 may be incorporated in the primary smart device 110 and/or the secondary smart devices 140. The profiling server 130 is described in greater detail as a hardware implementation with reference to FIG. 3, as part of a cloud implementation with reference to FIG. 4, and/or as utilizing functional abstraction layers for processing with reference to FIG. 5.

Initially, the exchange of data among the components of the voice compensation system 100 may be performed in a variety of manners based on a configuration of the components. The above description of select components indicate that a client-server relationship may be established that may imply that the components may interact with a separate component. Therefore, according to an exemplary implementation, the primary smart device 110 and the secondary smart devices 140 along with the profiling server 130 may be separate components that utilize the network 108 to exchange data. In performing the features of the exemplary embodiments, the primary smart device 110 may exchange data with the profiling server 130 to determine and apply compensation measures. The exemplary embodiments may further utilize different configurations with regard to the clients being incorporated with the primary smart device 110 and the programs being incorporated with the profiling server 130. For example, the primary smart device 110 may include the voice communication client 112 and the conditions client 114. However, the compensation client 116 may be included with the profiling server 130 such that a corresponding client on the primary smart device 110 may receive instructions from the profiling server 130 to apply the compensation measure via the network 108. According to another exemplary implementation, as noted above, the operations of the profiling server 130 and the profile repository 120 may be incorporated in the primary smart device 110. In this manner, the features of the exemplary embodiments may be incorporated in a single component of the voice compensation system 100 (e.g., the primary smart device 110). Although the primary smart device 110 performing all the operations may require additional resources and processing requirements, the issues that may arise may be related to signal strength where a connection in an implementation with a separate profiling server 130 is unavailable. Accordingly, an incorporated mechanism in the primary smart device 110 may address such a scenario. For illustrative purposes, the exemplary embodiments are described in the configuration illustrated in the voice compensation system 100 of FIG. 1. Accordingly, the profiling server 130 may determine the rules that define when and how to apply compensation measures. During a time when the primary smart device 110 has a connection to the profiling server 130 via the network 108, the primary smart device 110 may receive the rules. The subsequent operations involved in determining how and when to apply the compensation measure may be performed by the primary smart device 110.

In the exemplary embodiments, the identification program 132 may be a software, hardware, and/or firmware application configured to identify the user associated with the primary smart device 110 and the one or more secondary smart devices 140. Accordingly, information that is ascertained for the user, the primary smart device 110, and the secondary smart devices 140 may be associated with in a corresponding profile 122 for the user.

The identification program 132 may further be configured to identify events that may occur. As described above, the exemplary embodiments may be configured to proactively utilize compensation measures based on events that may potentially occur and corresponding conditions associated with the respective events. For example, the identification program 132 may receive information of a schedule of the user that may indicate where a user may be at a certain time. In another example, the identification program 132 may receive location information and correlate the location of the user to an event that may be occurring at the location or a general atmosphere of the location. The identification program 132 may also utilize clustering or population densities of a location to determine the general atmosphere of the location. In identifying these future events, the identification program 132 may update the profile 122 associated with the user with this information.

In the exemplary embodiments, the rules program 134 may be a software, hardware, and/or firmware application configured to generate rules to be used in utilizing compensation measures. The rules may define a correlation between a compensation measure and conditions that exist and/or are predicted to exist. The rules may further set out how the compensation measure is to be performed including proactive operations in preparation for effecting the compensation measure. The compensation measures that the rules program 134 may institute may include a switch from the primary smart device 110 to one of the secondary smart devices 140, a conversion of voice communications to text that may be read by the user of the primary smart device 110, an association from a first network to a second network where the second network provides a sufficient signal to perform the communication, or a layering of multiple networks to provide an improved signal to perform the communication.

The rules program 134 may perform the proactive operations for each compensation measure in a corresponding manner. For example, for the switch to one of the secondary smart devices 140, the rules program 134 may define a rule in which a contact is pre-dialed on the secondary smart device 140 for a seamless transition when the secondary smart device 140 becomes the primary smart device 110 (e.g., the user switches use in devices). In another example, for the conversion of the voice communications to text, the rules program 134 may define a rule in which the user interface for the voice communication client 112 introduces a view that shows the text in real time as the voice communications are received. In a further example, for the association to the second network or the layering of multiple networks, the rules program 134 may perform a background operation involving new or multiple connections being established.

The rules program 134 may further define the rules with correlations between compensation measures and the conditions being experienced or will likely experience. For example, for the switch to one of the secondary smart devices 140, the rules program 134 may generate a rule that defines the conditions as when the secondary smart device 140 is available and has a better signal strength to a network in which to perform the communication than a signal to the network of the primary smart device 140. In another example, for the conversion of voice communications to text, the rules program 134 may generate a rule that defines the conditions as when the ambient noise prevents the user from properly deciphering the voice communications uttered by the further user in the communication. In a further example, for the association to a second network, the rules program 134 may generate a rule that defines the conditions as when a further network is available to the primary smart device 110 having a sufficient signal strength that may be utilized to perform the communication where the further network may be a cellular network, a WiFi network, a Hot Spot, etc. In yet another example, for the layering of multiple networks, the rules program 134 may generate a rule that defines the conditions as when multiple networks are detected but the networks have an insufficient signal strength on an individual level. The rule may indicate which networks are to be layered so that the layered networks have a sufficient signal strength in which to perform the communication. The layering may be performed in a substantially similar manner as layering a carrier wave on top of a base signal.

The rules program 134 may also incorporate information from the identification program 132 to the rules and the corresponding compensation measures. For example, the rules program 134 may define a rule for when a future event that the user is planning to attend having an ambient noise that will likely prevent the user from properly deciphering incoming voice communications from the further user. The rule may indicate that the compensation measure for the conversion from voice to text is to be prepared. In another example, the rules program 134 may define a rule for when the user may constantly change location from an origin to a destination along a planned or likely route. The rule may indicate that the compensation measure for the association to a further network is to be prepared where the rule may also set forth likely further networks that may provide the sufficient signal strength to perform the communication based on the location. The rules program 134 may have access to a variety of databases or crowd-sourced information that indicates various networks that are available at select locations and corresponding signal strengths experienced by devices having substantially similar technical characteristics as the primary smart device 110.

The profiling server 130 may update the profile 122 with this information at a variety of times. For example, as new predictive information becomes available (e.g., an update to a calendar application), the rules program 134 may prepare corresponding rules based on the new predictive information and any corresponding changes that may result for previously determined rules. In another example, the profiling server 130 may update the profile 122 continuously or at predetermined time intervals while the primary smart device 110 and/or the secondary smart devices 140 are capable of exchanging data with the profiling server 130.

The profiling server 130 may also be configured to provide a most current form of the profile 122 associated with the user to the primary smart device 110 and/or the secondary smart devices 140. In this manner, the compensation client 116 may have the appropriate rules on which determining how and when to utilize a compensation measure is based. Armed with the profile 122, the compensation client 116 may utilize the conditions being experienced or will likely experience (e.g., according to the conditions client 114) and utilize an appropriate compensation measure for the conditions.

It is noted that the compensation client 116 may be performed as a background operation in which the user is provided the features of the exemplary embodiments without requiring manual inputs. Thus, the rules that are provided to the compensation client 116 may be effected as the conditions dictate and any change that warrants an alert to the user may be provided while other changes that do not require the user's attention may be omitted. For example, the compensation client 116 may alert the user that the voice communications will be converted to text to prepare the user for altering a position that the primary smart device 110 is being held so that the text may be read. In another example, the compensation client 116 may alert the user that an association to a new network will be created to perform or continue the communication. Such a feature may require the user to accept the use of the new network, particularly if the new network has a cost (e.g., financial) associated therewith. In a further example, the compensation client 116 may omit alerting the user when the association to the new network has been known to be used by the user at historical times or is a network that the primary smart device 110 has previously associated. However, the use of the automated, background approach of the features of the exemplary embodiments is only exemplary. In another exemplary implementation, the compensation client 116 may be utilized in a semi-automated approach in which select operations require manual inputs. For example, the compensation client 116 may generate recommendations as to the compensation measure to be used based on the conditions. Accordingly, the user may accept the compensation measure and the compensation client 116 may proceed with subsequent corresponding operations or decline the compensation measure and continue the communication under the current parameters. In this manner, a manual override option may be presented to the user in utilizing or bypassing the compensation measure.

As described above, the exemplary embodiments may utilize a variety of compensation measures to address issues that have arisen or may arise for a communication. The compensation measures may include connectivity approaches, device approaches, or interface approaches. The voice compensation system 100 may provide a method of layering both cellular and VoIP if both signal strengths to respective networks are weak (e.g., below an acceptable threshold to perform the communication using an individual network) to enhance sound quality. The voice compensation system 100 may also provide a switching among devices associated with the user to occur after inspecting the respective signal strength received on each individual device. The switching may also be modified based on user preferences such as a preference order for using the various devices associated with the user (e.g., for communications, a smart phone is preferred over a tablet). If a weak signal still persists after layering and/or if the ambient noise conditions prevent the user from hearing utterances from the further user in the communication, the voice compensation system 100 may transcribe the voice from the further user to text form in a real time speech 'free flowing' text display format as an additional method for communication in low bandwidth environments.

In an exemplary implementation, the voice compensation system 100 may predict when a compensation measure may be applicable. For example, a user may purchase tickets to a concert. In another example, a prediction system of the voice compensation system 100 (e.g., the identification program 132) may scan major venues for online event schedules and incorporate those events into prediction pattern models. In a further example, bandwidth needs may be forecast based on historical data. In yet another example, spontaneous events (e.g., protests) may be dynamically addressed based on the congregation of location data from users attending the event. Using these inputs, the voice compensation system 100 may predict and/or prepare for the compensation measures such as layering technologies to be effected and vendors or IT providers may also prepare for higher levels of data consumption to prevent network saturation. This may further be visualized in real-time density maps in which artificial intelligence or rules program 134 may monitor for network congestion.

According to the exemplary implementation, an audio engine and/or signal monitoring engine (e.g., as embodied in the conditions client 114) may identify that there is a problem or saturation within a network which results in a voice quality that is not clear. The compensation client 116 may apply a compensation measure in which the communication is changed seamlessly to another device of the user (e.g., one of the secondary smart devices 140 that becomes the primary smart device 110) where the network signal strength is comparatively better.

According to the exemplary implementation, a noise engine (e.g., as embodied in the conditions client 114) may identify that the surrounding or ambient noise is not allowing the user to listen to the content of the communication. The compensation client 115 may apply a compensation measure in which the mode of communication for the user is changed from voice to text, and the user may reply the same in the form of text. The conditions client 114 may further listen for Indicators of Degradation (IoD) based on user preferences and privacy preferences. The IoD may define verbal queues from the user to identify when the ambient noise is too high or generally to indicate when the user is incapable of understanding the voice communications from the further user. For example, the IoD may include "I can't hear you," "What did you say?," "Please speak up," etc. which is used to improve the communications via the voice to text conversion. This information may also be used to supplement other users' quality of communications in close proximity through sharing of that context to improve communications performance for the other users.

According to the exemplary implementation, if the telephonic network signal (e.g., a first network such as a cellular network) is not strong or sufficient enough to continue the communication, the compensation client 116 may utilize the rules to perform a cost benefit analysis to determine if the mode of communication or the network in use may be changed to a further network such as a paid WiFi available at the current location of the primary smart device 110 or whether an unsecured fee or free WiFi may be connected. In a feature of the exemplary embodiments, in an event where the networks may belong to competing entities (e.g., a market place with competing communication providers), the exemplary embodiments may enable the layering of communications with another carrier to "piggy-back" off available bandwidth among the networks. For example, if a first network line is bandwidth constrained, a second network may share available bandwidth to better serve the customer base through load balancing between competing networks.

According to the exemplary implementation, the compensating client 116 may use rules that are based on historical data analysis from different users such that the rules may predict network outages during a voice communication. Accordingly, based on a priority of the current communication, the compensation client 116 may proactively create a parallel network to ensure seamless communication. For example, dialing may be performed in advance, a conference call may be proactively joined with another device, etc.

According to the exemplary implementation, a signal monitoring engine (e.g., as embodied in the conditions client 114) may determine the above approaches only provide a signal strength that does not satisfy a minimum threshold level of having an uninterrupted communication session. Accordingly, the compensation client 116 may perform a layering of multiple networks (e.g., cellular and VoIP) as a result of the signal strengths being received from the available networks being below the minimum threshold level.

The following provides an exemplary process in which the features of the exemplary embodiments may be provided. The following will be described with regard to the voice compensation system 100 of FIG. 1 and may provide further details or expand on the above description for select components. The following may also be an implementation in which there are multiple secondary smart devices 140. The following may also refer to a configuration in which the operations of the profiling server 130 are incorporated in the primary smart device 110. Accordingly, the operations of the identification program 132 and the rules program 134 may be performed by the primary smart device 110.

The primary smart device 110 and the secondary smart devices 140 may share telephone network signal strengths with each other as measured through the conditions clients 114, 144 of the respective devices. The primary smart device 110 and the secondary smart devices 140 may provide the signal strengths to, for example, the compensation client 116 that determines which of the devices has a comparatively better network strength to perform a communication. The primary smart device 110 and/or the secondary smart devices 140 may also check for availability of further networks such as WiFi networks in the vicinity of the primary smart device 110 as well as gather cost and social network feedback regarding these further networks. These processes may occur in preparation for, at an onset of, and/or during a communication being performed.

During a voice communication session (e.g., a telephonic communication), the compensation client 116 installed in the primary smart device 110 may analyze a received audio quality of incoming voice communications from a further user of the communication session and may verify whether the quality of the audio satisfies a specified threshold limit. The conditions client 114 may also track any external noise (e.g., ambient noise condition) and may validate if the user is having difficulty to understand the spoken content (e.g., utterances from the further user). The compensation client 116 may utilize historical data (e.g., as analyzed by a historical data analysis program (not shown)) to identify a pattern of network strength reduction. Based on this information, the compensation client 116 may initiate a parallel mode of communication in a proactive manner to ensure seamless communication when such a compensation measure is to be used.

The compensation client 116 may also utilize rules that may be stored in a profile 122 from a determination by the profiling server 130. The profile 122 may be a dynamic profile that is created to aid in analyzing and responding to any communication issue. The profile 122 may consider many factors in analyzing the communication needs proactively. In performing this operation, the profiling server 130 may utilize an identification program 132 and a rules program 134. The identification program 132 in conjunction with the compensation client 116 may be configured to perform an analysis of the situation and the conditions of the situation. The identification program 132 may track and record the communication based on many factors. For example, the factors may include a location where a location profile may consider a nature of the surrounding terrain, area geography, history of noise, jitter, availability of further networks, etc. In another example, the factors may include activity such as an event type, a number and type of expected users, a demography of the users, etc. In a further example, the factors may include a communication considering including a type and number of devices, a type of call (e.g., business, personal, etc.), data consumption (e.g., video, audio, images, etc.), a handover ability, a call setup, parties to the communication, etc. In yet another example, the factors may include history and shared information including previous data, a vote from users about an experience about the location and communication, etc. The rules program 134 may be a decision-based engine configured to generate rules that may proactively prepare a set of actions based on a type of communication issue. The rules program 134 may be trained to dynamically respond to communication needs by comparing the a variety of factors such as an individual call quality, an overall network situation and saturation factor, etc. The rules program 134 may generate rules for various types of operations for compensation measures. The compensation measures may include a switch of a call session without affecting the call, an alert for the user about a recommended channel to complete the communication, a hop of the communication from a first network (e.g., cellular) to a second network (e.g., VOIP), a completion of intra-area calls through a network type (e.g., WiFi), a conversion of speech to text mode, etc. In an exemplary use of the above process, the user may want to call a further user both located in the same area or building. The communication session may be completed by the identification program 132 identifying the two parties, the location, the availability of WiFi, etc. while the rules program 134 may become aware of the availability of WiFi such that the compensation client 116 may follow a rule that permits a switching of the communication from the cellular network to WiFi.

If a communication is in progress, the conditions client 114 may measure a quality of the incoming voice communications. The compensation client 116 may analyze an appropriate switching mode for the current communication and may proactively create parallel network connections to ensure a seamless communication. Furthermore, with the signal strength of the available communication modes (e.g., cellular and VoIP) being relatively weak (e.g., below a sufficient threshold to perform the communication), the compensation client 116 may layer the cellular signal on top of the VoIP signal or vice versa to bind a strong signal strength that may satisfy the sufficient threshold for the user to engage in the communication seamlessly.

Figure 2:
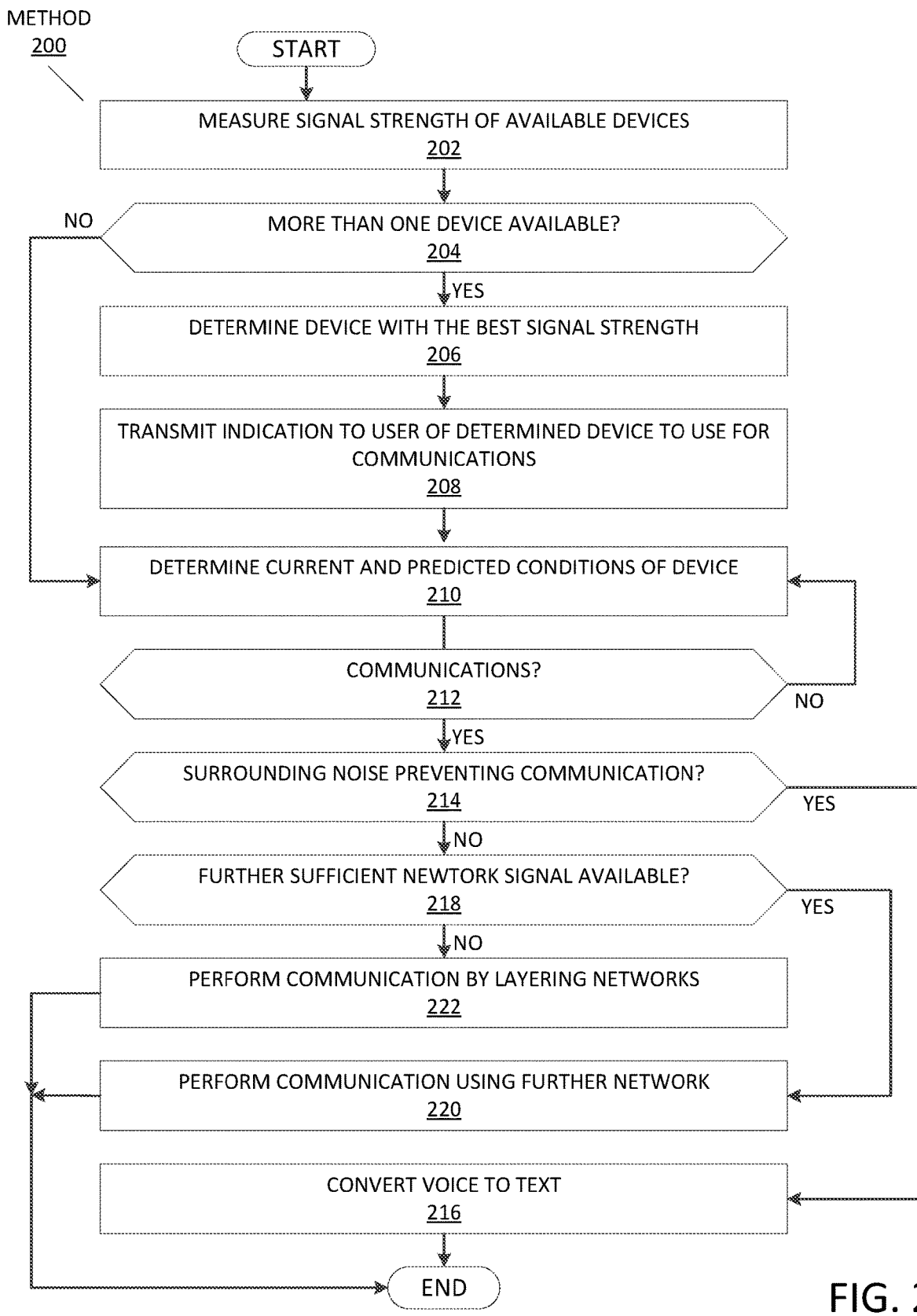
FIG. 2 depicts an exemplary flowchart of a method illustrating the operations of a smart device 110 of the voice compensation system 100 in predictively compensating for expected audio communication issues, in accordance with the exemplary embodiments.

FIG. 2 depicts an exemplary flowchart of a method 200 illustrating the operations of the smart device 110 of the voice compensation system 100 in predictively compensating for expected audio communication issues, in accordance with the exemplary embodiments. The method 200 may relate to operations that are performed by the conditions client 114, the compensation client 116, the identification program 132, and the rules program 134 while a communication is or will be performed via the voice communication client 112. Accordingly, the method 200 is described with regard to the exemplary implementation where the operations of the profiling server 130 is incorporated in the primary smart device 110 that is being used by the user while a plurality of secondary smart devices 140 are also available for use by the user. The method 200 will be described from the perspective of the primary smart device 110.

The primary smart device 110 and the secondary smart devices 140 may measure signal strengths of a network (step 202). For example, the network may be a cellular network in which a telephonic communication may be performed. However, the use of the cellular network is only exemplary. In another exemplary embodiment, the network may be a WiFi network or any other type of network in which a voice communication may be performed. The primary smart device 110 and the secondary smart devices 140 may measure signal strengths to other networks that may be available for subsequent considerations.

The primary smart device 110 may determine whether the user has access to at least one of the secondary smart devices 140 (decision 204). As described above, the user may be associated with a plurality of devices and may have the primary smart device 110 and at least one of the secondary smart devices 140 on the user's person. Thus, as a result of the user having the primary smart device 110 and at least one of the secondary smart devices 140 (decision 204, "YES" branch), the primary smart device 110 may determine which of the devices associated with the user has a comparatively better signal strength (i.e., which device has the best signal strength to the network) (step 206). The primary smart device 110 may transmit an indication to the user regarding which device is to be used for a communication (step 208). The method 200 may incorporate further operations such as receiving an input from the user a to whether the determined device will be used or whether the user will continue to utilize the primary smart device 110 currently in use.

When only the primary smart device 110 is available (decision 204, "NO" branch) or the user having selected the primary smart device 110 among the primary smart device 110 and the secondary smart devices, the primary smart device 110 may determine current and predicted conditions thereof as well as for the user (step 210). For example, the conditions may be related to available signals from respective networks, corresponding signal strengths, ambient noise conditions, location information, event information, etc. The primary smart device 110 may continue to monitor the conditions of the primary smart device 110 and the user in preparation for when a communication is to be performed.

At a subsequent time, the user may select to perform a communication such that the primary smart device 110 may determine whether such an action is being performed (decision 212). If a communication is not being performed (decision 212, "NO" branch), the primary smart device 110 continues to monitor the conditions. As a result of the communication functionality (e.g., via the voice communication client 112) being used to perform a communication (decision 212, "YES" branch), the primary smart device 110 may perform a plurality of operations based on rules that are determined in utilizing compensation measures. For example, the rules may be determined by the identification program 132 and the rules program 134 so that a compensation measure may be effected upon determining a set of conditions exists for the user and/or the primary smart device 110.

The primary smart device 110 may determine whether the conditions include a surrounding or ambient noise condition that prevents the user from understanding incoming voice communications (decision 214). Accordingly, this determination may occur during the communication. As the ambient noise condition may be independent from a connectivity consideration, the primary smart device 110 may perform this operation at any time during the communication and may further utilize IoDs to determine whether the user is having difficulty in understanding the further user. As a result of the ambient noise condition being present (decision 214, "YES" branch), the primary smart device 110 may utilize a compensation measure in which voice is converted to text so that the user may read the voice communications from the further user (step 216). The primary smart device 110 may also convert input voice communications from the user and convert to text to be transmitted to the further user such as when the ambient noise condition also prevents the further user from understanding the user.

As a result of the ambient noise condition being within acceptable limits (decision 214, "NO" branch), the primary smart device 110 may determine whether a further network is available that provides a sufficient signal strength to perform the communication (decision 218). In performing this operation, the primary smart device 110 may have determined that the current signal strength to a first network is not sufficient to perform the communication so that the user is provided a satisfactory user experience. Thus, the primary smart device 110 may identify further networks such as WiFi networks or unsecured networks that may be used in performing the communication. As a result of the signal strength to the first network being poor but the signal strength to a second network being good (decision 218, "YES" branch), the primary smart device 110 may utilize a compensation measure in which the primary smart device 110 associated with the second network to perform the communication (step 220).

As a result of the further network also having a signal strength that is poor (decision 218, "NO" branch), the primary smart device 110 may utilize a compensation measure in which networks may be layered to strength an overall signal strength to perform the communication (step 222). In such a scenario, the signal strength to the first network and to the second network may be poor but the layering may result in an overall signal strength that may satisfy a minimum threshold to perform the communication. For example, the primary smart device 110 may layer the cellular network over the WiFi network or vice versa.

The above described process of utilizing compensation measures is only exemplary. For example, an ordering of considerations for using the compensation measures is only shown for illustrative purposes. As already noted, the compensation measure to convert voice to text may be independent of the signal strength considerations. Accordingly, the exemplary embodiments may consider each compensation measure as an ordered list according to a priority, on an individual basis independent from one another, on a concurrent basis, etc. According to an exemplary implementation, the primary smart device 110 may utilize the layering compensation measure and additionally consider the other compensation measures at the same time. For example, the primary smart device 110 may select to layer the cellular network over the WiFi network and also utilize the voice to text compensation measure.

The exemplary embodiments are configured to provide a mechanism in which to address issues that may exist or already exists for a communication so that the user is provided a seamless manner of performing the communication successfully. The exemplary embodiments may utilize compensation measures that may overcome the issues based on conditions that are expected or are being experienced. The compensation measures may include a layering of networks to generate a signal strength that is sufficient to perform the communication where signal strengths for the networks may not satisfy a minimum threshold individually. The compensation measures may further include a voice to text conversion mechanism, a switch to a further network mechanism, and a selecting of a further device that may have a comparatively better signal strength to one or more networks.

Figure 3:
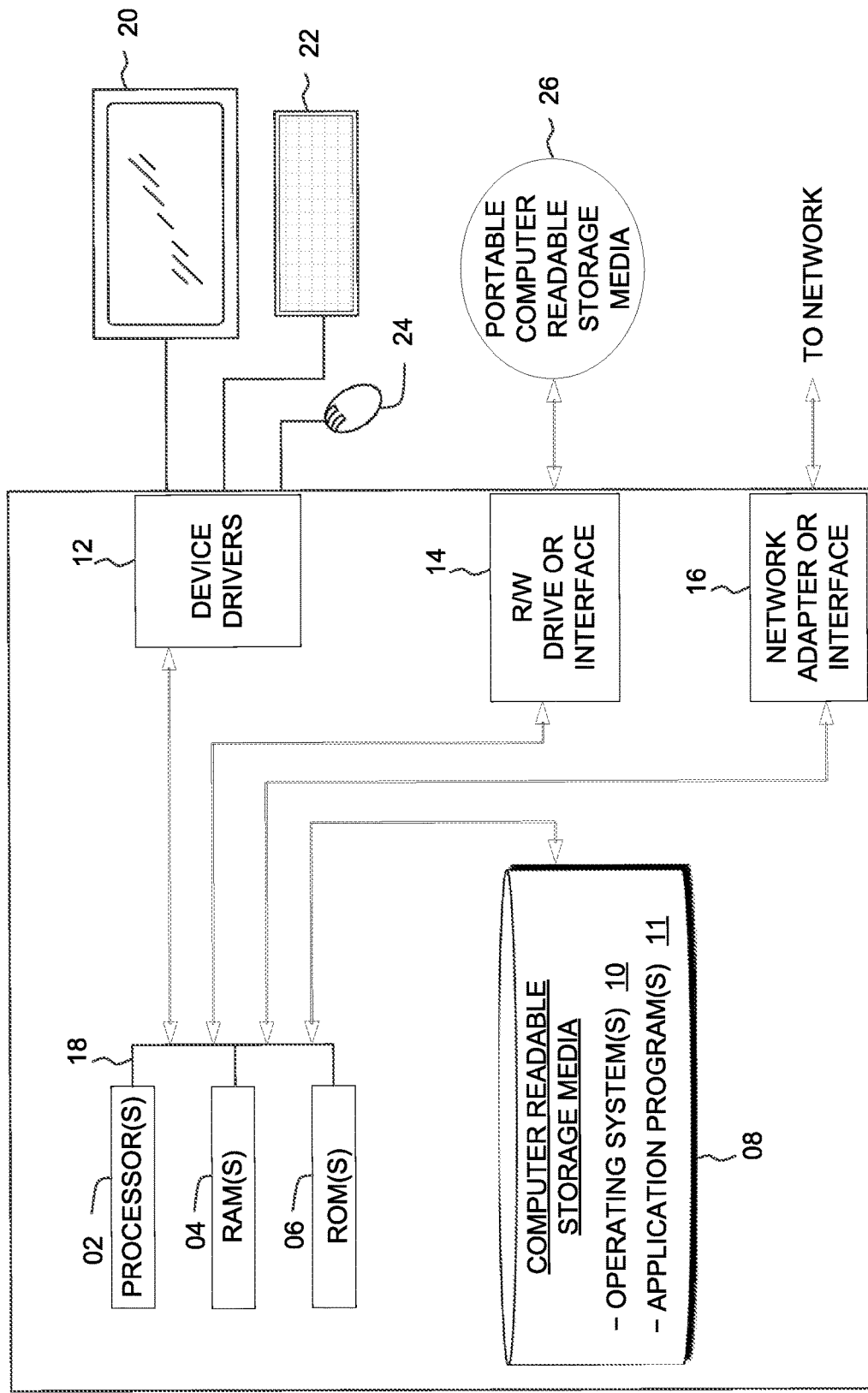
FIG. 3 depicts an exemplary block diagram depicting the hardware components of the voice compensation system 100 of FIG. 1, in accordance with the exemplary embodiments.

FIG. 3 depicts a block diagram of devices within the voice compensation system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
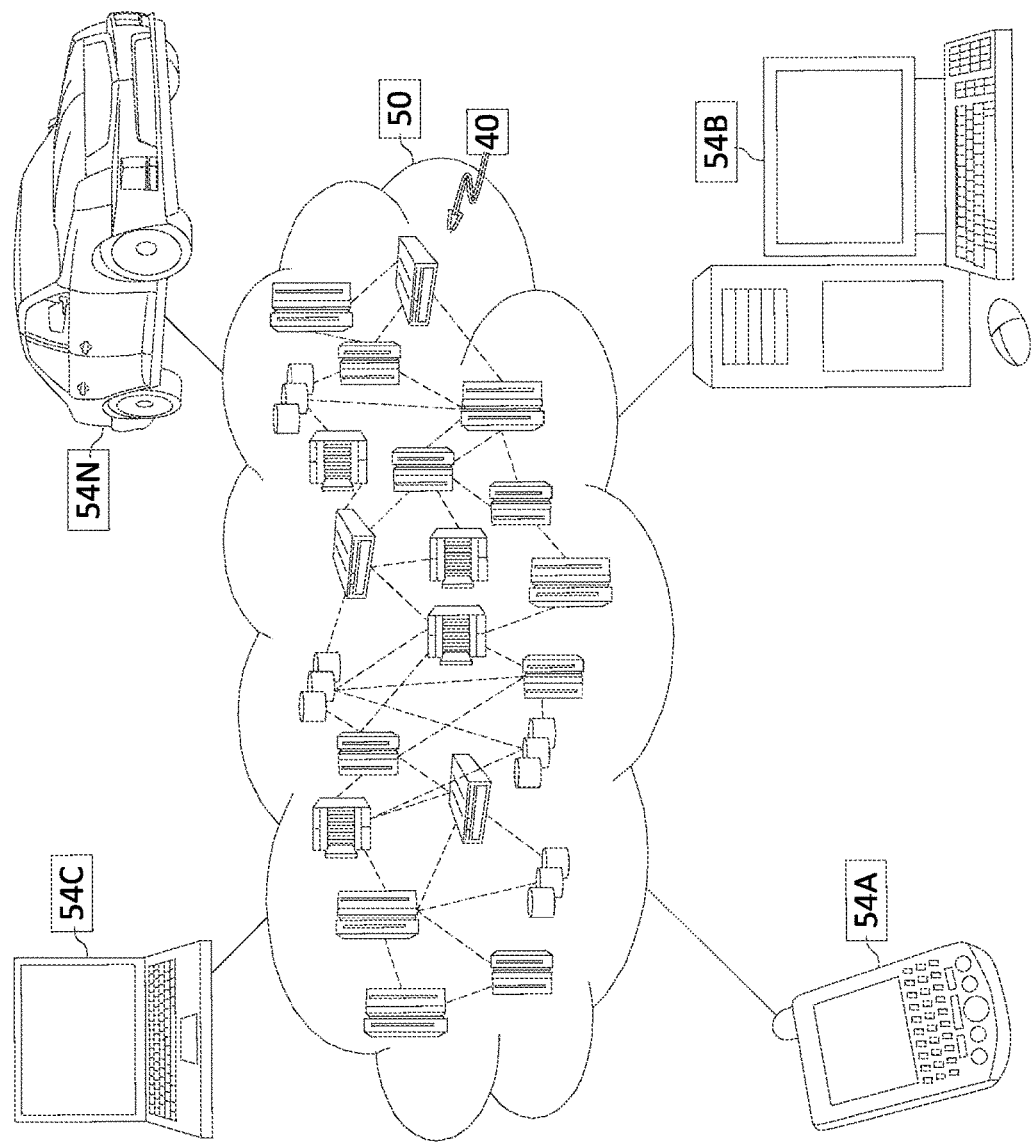
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
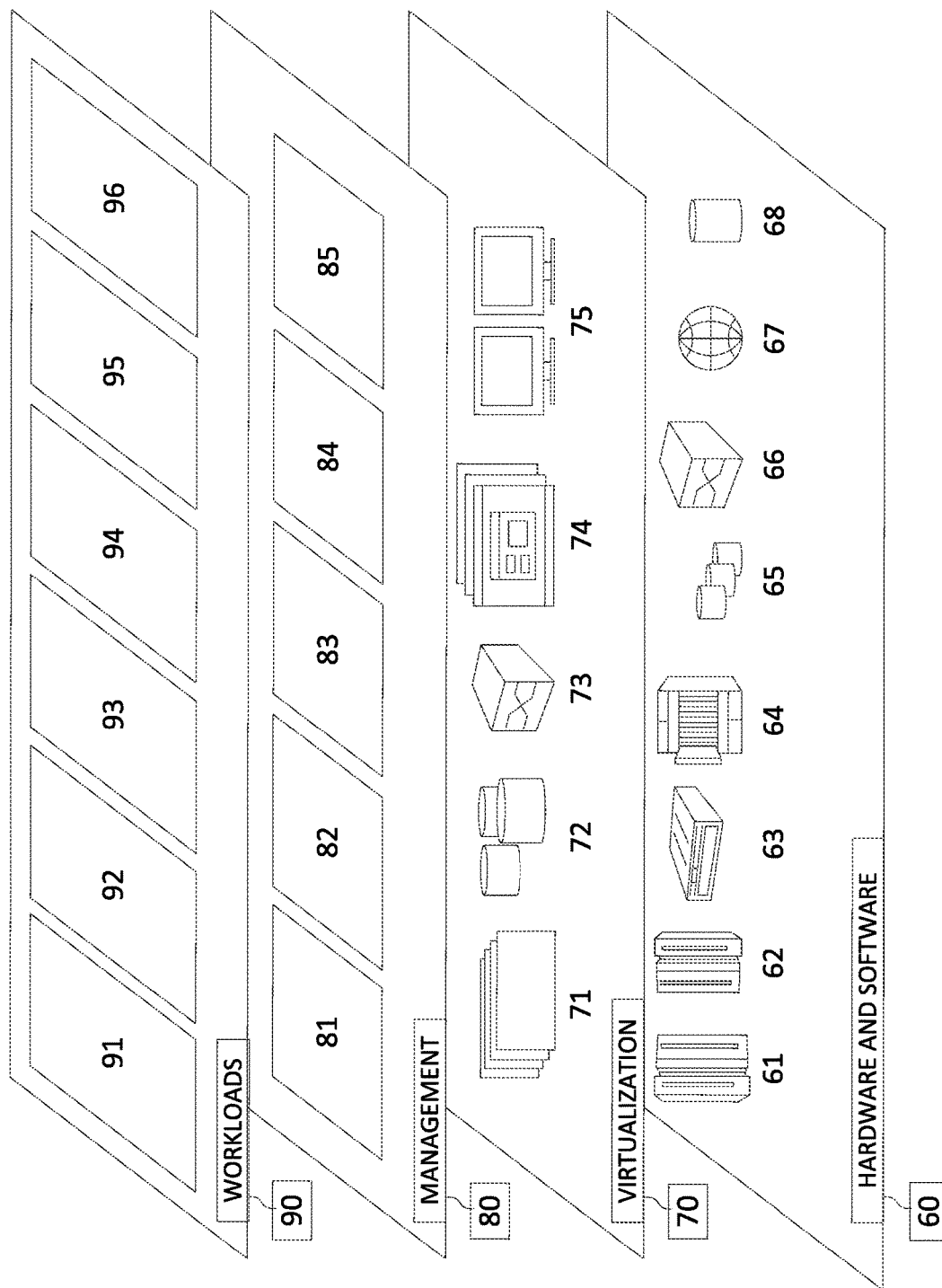
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and seamless communication processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for predictively compensating for expected audio communication issues, the method comprising:
    determining conditions of a first device associated with a user;
    determining further conditions of a second device associated with the user;
    determining, based on the conditions, a first signal strength to a first network that the first device is currently connected to in which to perform a communication and a second signal strength to a second network that the first device is configured to utilize in performing the communication;
    determining, based on the further conditions, a third signal strength to the first network that the second device is currently connected to in which to perform the communication;
    as a result of each of the first signal strength and the second signal strength not satisfying a minimum threshold individually, generating an overall signal having an overall signal strength by layering the first network over the second network, the overall signal strength having a comparatively greater signal strength than the first signal strength and the second signal strength;
    selecting whether to perform the communication using the first device or the second device;
    in response to selecting the first device, performing the communication using the overall signal; and
    in response to selecting the second device, transmitting an indication to the user to utilize the second device to perform the communication.

2. The computer-implemented method of claim 1, wherein the indication is transmitted during the communication and the method further comprises:
    proactively connecting the second device to the communication.

3. The computer-implemented method of claim 1, further comprising:
    determining additional conditions associated with the user, the additional conditions related to an ambient noise condition that prevents the user from understanding incoming voice communications in the communication;
    converting the incoming voice communications from voice to text; and
    presenting the converted incoming voice communications to the user.

4. The computer-implemented method of claim 1, wherein the second signal strength is greater than the first signal strength, the method further comprising:
    associating the first device with the second network such that the first device is connected to the second network.

5. The computer-implemented method of claim 1, wherein the first network is a cellular network and the second network is a WiFi network.

6. A computer program product for predictively compensating for expected audio communication issues, the computer program product comprising:
    one or more non-transitory computer-readable storage media and program instructions stored on the one or more non-transitory computer-readable storage media capable of performing a method, the method comprising:
        determining conditions of a first device associated with a user;
        determining further conditions of a second device associated with the user;
        determining, based on the conditions, a first signal strength to a first network that the first device is currently connected to in which to perform a communication and a second signal strength to a second network that the first device is configured to utilize in performing the communication;
        determining, based on the further conditions, a third signal strength to the first network that the second device is currently connected to in which to perform the communication;
        as a result of each of the first signal strength and the second signal strength not satisfying a minimum threshold individually, generating an overall signal having an overall signal strength by layering the first network over the second network, the overall signal strength having a comparatively greater signal strength than the first signal strength and the second signal strength;
        selecting whether to perform the communication using the first device or the second device;
        in response to selecting the first device, performing the communication using the overall signal; and
        in response to selecting the second device, transmitting an indication to the user to utilize the second device to perform the communication.

7. The computer program product of claim 6, wherein the indication is transmitted during the communication and the method further comprises:
    proactively connecting the second device to the communication.

8. The computer program product of claim 6, wherein the method further comprises:
    determining additional conditions associated with the user, the additional conditions related to an ambient noise condition that prevents the user from understanding incoming voice communications in the communication;
    converting the incoming voice communications from voice to text; and
    presenting the converted incoming voice communications to the user.

9. The computer program product of claim 6, wherein the second signal strength is greater than the first signal strength, the method further comprising:
    associating the first device with the second network such that the first device is connected to the second network.

10. The computer program product of claim 6, wherein the first network is a cellular network and the second network is a WiFi network.

11. A computer system for predictively compensating for expected audio communication issues, the computer system comprising:
one or more computer processors, one or more computer-readable storage media, and program instructions stored on the one or more of the computer-readable storage media for execution by at least one of the one or more processors capable of performing a method, the method comprising:
determining conditions of a first device associated with a user;
determining further conditions of a second device associated with the user;
determining, based on the conditions, a first signal strength to a first network that the first device is currently connected to in which to perform a communication and a second signal strength to a second network that the first device is configured to utilize in performing the communication;
determining, based on the further conditions, a third signal strength to the first network that the second device is currently connected to in which to perform the communication;
as a result of each of the first signal strength and the second signal strength not satisfying a minimum threshold individually, generating an overall signal having an overall signal strength by layering the first network over the second network, the overall signal strength having a comparatively greater signal strength than the first signal strength and the second signal strength;
selecting whether to perform the communication using the first device or the second device;
in response to selecting the first device, performing the communication using the overall signal; and
in response to selecting the second device, transmitting an indication to the user to utilize the second device to perform the communication.

12. The computer system of claim 11, wherein the indication is transmitted during the communication and the method further comprises:
proactively connecting the second device to the communication.

13. The computer system of claim 11, wherein the method further comprises:
determining additional conditions associated with the user, the additional conditions related to an ambient noise condition that prevents the user from understanding incoming voice communications in the communication;
converting the incoming voice communications from voice to text; and
presenting the converted incoming voice communications to the user.

14. The computer system of claim 11, wherein the second signal strength is greater than the first signal strength, the method further comprising:
associating the first device with the second network such that the first device is connected to the second network.

* * * * *